(12) United States Patent
Mowers (10) Patent No.: US 7,255,035 B2
(45) Date of Patent: Aug. 14, 2007

(54) WEAPONRY CAMERA SIGHT

(76) Inventor: Michael S. Mowers, 260 Mainsville Rd., Shippensburg, PA (US) 17257

( * ) Notice: Subject to any disclaimer, the term of this patent is extended or adjusted under 35 U.S.C. 154(b) by 337 days.

(21) Appl. No.: 10/840,400

(22) Filed: May 7, 2004

(65) Prior Publication Data

US 2005/0246910 A1    Nov. 10, 2005

(51) Int. Cl.
*F41G 1/467* (2006.01)
(52) U.S. Cl. .................. 89/41.05; 89/41.17; 42/131
(58) Field of Classification Search ............. 89/41.05, 89/41.17, 41.06; 42/114, 115, 130, 131, 42/142
See application file for complete search history.

(56) References Cited

U.S. PATENT DOCUMENTS

| | | | | |
|---|---|---|---|---|
| 4,514,907 A | | 5/1985 | Saltzman ..................... 33/265 |
| 4,617,741 A | | 10/1986 | Bordeaux et al. ............. 33/228 |
| 4,835,621 A | * | 5/1989 | Black .......................... 386/118 |
| 4,961,278 A | | 10/1990 | Johnson et al. ............... 42/103 |
| 5,020,262 A | | 6/1991 | Pena ............................ 42/106 |
| 5,180,875 A | | 1/1993 | Berry, Jr. et al. ............. 42/101 |
| 5,495,675 A | * | 3/1996 | Huang ......................... 42/115 |
| 5,575,072 A | | 11/1996 | Eldridge ...................... 33/265 |
| 5,924,867 A | | 7/1999 | Lautsbaugh .................. 73/167 |
| 5,982,429 A | * | 11/1999 | Kamamoto et al. .... 348/333.06 |
| 6,073,352 A | | 6/2000 | Zykan et al. ................. 33/265 |
| 6,226,880 B1 | | 5/2001 | Pitre ............................ 33/246 |
| 6,269,581 B1 | | 8/2001 | Groh ........................... 42/122 |
| 6,272,785 B1 | * | 8/2001 | Mika et al. ..................... 42/94 |
| 6,397,483 B1 | | 6/2002 | Perkins ........................ 33/265 |
| 6,449,419 B1 | | 9/2002 | Brough et al. .............. 385/136 |
| 6,519,083 B2 | | 2/2003 | Heinrich ...................... 42/119 |
| 6,539,177 B2 | * | 3/2003 | Parulski ...................... 396/287 |
| 6,539,661 B2 | | 4/2003 | Hope ........................... 42/119 |
| 6,556,245 B1 | | 4/2003 | Holmberg ................... 348/375 |
| 6,557,291 B2 | | 5/2003 | Hoadley ....................... 42/111 |
| 6,681,512 B2 | | 1/2004 | Sammut ....................... 42/122 |
| 2002/0122248 A1 | | 9/2002 | Heinrich ...................... 359/425 |
| 2003/0110647 A1 | | 6/2003 | Henry .......................... 124/87 |
| 2004/0031184 A1 | | 2/2004 | Hope ........................... 42/111 |
| 2004/0204083 A1 | * | 10/2004 | Watanabe et al. ........... 455/557 |

OTHER PUBLICATIONS http://www.archeryhistory.com/sights/pics/leupold.jpg Website (Undated), Downloaded on Mar. 11, 2004, Advertisement for Leupold M1 Optical Bow Sight, 1 page.

* cited by examiner

*Primary Examiner*—Stephen M. Johnson
(74) *Attorney, Agent, or Firm*—Dolph H. Torrence (57) ABSTRACT

The weaponry camera sight has a digital electronic display of the sight picture for the shooter. The display may be magnified as desired, thereby eliminating need for a scope sight. The device may also include a range finding device, with range information being provided on screen. The camera may also be used to record the image viewed on screen, if so desired. Remotely situated controls may be provided for operating the zoom magnification and recording feature, thereby allowing the shooter to operate the present camera sight without need to move his or her hands on the weapon. The present camera sight is particularly well suited for use with an archery bow, but may be used with a firearm if so desired.

16 Claims, 5 Drawing Sheets

WEAPONRY CAMERA SIGHT

BACKGROUND OF THE INVENTION

1. Field of the Invention

The present invention relates generally to handheld weaponry used for hunting and target shooting, and more specifically to a digital electronic camera sight which may be used with any such weapons to serve as both a sighting device and as a recording device. The present camera sight preferably includes adjustable magnification to eliminate the need for a scope, as well as a relatively wide field of view and range finding means.

2. Description of the Related Art

Traditionally, sights used for firearms and archery have used purely optical principles, ranging from conventional open sights to magnifying scopes on firearms of various types. The archery field was later in the development of specialized sighting means, with bowstring and bow mounted sighting aids and other devices being developed relatively recently. Even more recently, video recording devices (either still or motion) have been combined with firearm scopes to provide a means of recording the sight picture viewed through the firearm scope for later viewing and/or analysis.

As a result of the development of relatively small and lightweight digital cameras and video recording devices, there has been some development of the addition of such devices to archery equipment. The present inventor is aware of at least some digital electronic video recording equipment which has been installed upon an archery bow or some component thereof. However, the present inventor is unaware of any such electronic video equipment which has been developed as an archery bow sight, and which is capable of performing as a bow sight and also capable of recording the image viewed through the sight.

Accordingly, the present invention responds to this need by providing a combination camera and sight for use with an archery bow, and attachment means for mounting the camera sighting device to the bow. The present invention also includes at least one embodiment providing an alternative attachment assembly for securing the device to a firearm, e.g., a hunting or target rifle or the like. The present camera sight also includes means for determining the range to the target, and displaying the range to the shooter. The present invention also includes zoom magnification, thus eliminating the need for a relatively bulky magnifying scope while also providing a relatively large field of view for the shooter. Remotely located control switches may be provided for certain operations, e.g., zoom magnification, camera operation, etc., in order to obviate need for the shooter to move his or her hands during camera and sight operation.

A discussion of the related art of which the present inventor is aware, and its differences and distinctions from the present invention, is provided below.

U.S. Pat. No. 4,514,907 issued on May 7, 1985 to Leonard F. Saltzman, titled "Bow And Arrow Sighting Device," describes a mechanically adjustable bow sight. Saltzman does not provide any means of recording a visual image viewed by or through his sight, and no magnification of the image is provided by Saltzman. While the Saltzman device provides for elevation adjustment to adjust for target range, it is a purely mechanical system and does not include any electronic display means or means for adjusting for range or adjusting the sight reticle, as provided by the present invention. Moreover, the Saltzman device is relatively restricted in its application, and cannot be installed upon a firearm, as can the present camera sight.

U.S. Pat. No. 4,617,741 issued on Oct. 21, 1986 to Marvin L. Bordeaux et al., titled "Electronic Rangefinder For Archery," describes a device which uses a passive principle to determine range to a target. The device requires the archer to have some idea of the size of his or her target, and then align the target between a pair of lines on the viewing screen. A given size target, when positioned exactly between lines having a certain distance therebetween, enables the device to calculate and display the range to the target on a digital readout. This system of estimating target range is approximate at best, as the exact size of the target cannot be known. Moreover, Bordeaux et al. do not provide any form of magnification or image recording.

U.S. Pat. No. 4,961,278 issued on Oct. 9, 1990 to Charles B. Johnson et al., titled "Day/Night Telescopic Sight," describes a device which may be attached to the eyepiece of a firearm scope and which may be used to selectively intensify the image under low light conditions. Since the Johnson et al. device uses the existing firearm scope, it does not provide any magnification of the image per se. Moreover, as the Johnson et al. device is adapted for use with a firearm scope, no means is provided for attaching the device to an archery bow. It is also noted that no range finding means or image recording means is provided by the Johnson et al. sight.

U.S. Pat. No. 5,020,262 issued on Jun. 4, 1991 to Louis T. Pena, titled "Camera Mount For Rifle Scopes," describes a scope attachment using a half silvered mirror to reflect the image from the eyepiece of the scope through a series of mirrors to a camera secured atop the scope. No magnification is provided by the Pena device, as the scope provides the required magnification. Moreover, no range finding capability is disclosed by Pena in his camera mount, and any sight reticles would be provided within the scope itself, rather than in the Pena camera mount apparatus. Pena only discloses a mount for a firearm scope; no means of attaching his camera to an archery bow, is disclosed.

U.S. Pat. No. 5,180,875 issued on Jan. 19, 1993 to Waldo A. Berry, Jr. et al., titled "Scope Adjustment For Firearms," describes a side wheel and bevel gear arrangement for turning the concentric adjustment wheel to adjust the zoom magnification in a rifle scope. No additional sighting or optical means, or range finding means, is provided by Berry, Jr. et al. Their device operates strictly to facilitate the adjustment of an existing conventional zoom magnification adjustment on a rifle scope.

U.S. Pat. No. 5,575,072 issued on Nov. 19, 1996 to Gary Eldridge, titled "Electric Archery Bow Sight/Range Finder," describes a device which requires the archer to first determine the distance to program the positioning of the sights in the device. The archer may then make an estimate of the distance to a target, with the device then providing a sight alignment according to the estimated distance. No actual means of measuring the distance to the target is provided by the Eldridge device. The Eldridge device cannot provide a digital visual image of the target, nor can it record such an image or provide image magnification. The Eldridge device only provides a sight alignment and/or digital readout of distance, according to the distance estimated by the archer.

U.S. Pat. No. 5,924,867 issued on Jul. 20, 1999 to Deron Lautsbaugh, titled "Computerized Archery Aid," describes an enclosed archery shooting range having video cameras situated therein. The cameras record the flight of an arrow(s)

fired by an archer to provide feedback to the archer for sighting in his or her bow. No bow mounted sighting device is disclosed by Lautsbaugh.

U.S. Pat. No. 6,073,352 issued on Jun. 13, 2000 to Blair J. Zykan et al., titled "Laser Bow Sight Apparatus," describes the installation of a laser rangefinder device with an archery bow. The Zykan rangefinder provides only a digital display of the distance and illuminates a corresponding sight pin or pins in a conventional archery range sight assembly. No target picture or magnification of such a picture is provided by Zykan et al. As Zykan et al. do not provide a camera with their apparatus, they cannot provide any means of recording a sight picture image, as can the present system. Moreover, Zykan et al. do not disclose any means of using their rangefinder device on a firearm, as provided by the at least one embodiment of the present invention.

U.S. Pat. No. 6,226,880 issued on May 8, 2001 to Rhett Pitre, titled "Quick Focusing Firearm Scope," describes a cable actuated focusing mechanism for a rifle scope or the like. The Pitre device is purely mechanical, and does not include any electrical or electronic componentry. The Pitre device includes a trigger guard mounted sector gear which engages a gear driven cable, with the cable driving a ring gear around the focusing ring of the scope. No range finding means, means of electronically or otherwise recording the image viewed through the scope, or means for providing an archery bow sight, is provided by Pitre.

U.S. Pat. No. 6,269,581 issued on Aug. 7, 2001 to John Groh, titled "Range Compensating Rifle Scope," describes a rifle scope having a laser rangefinder device incorporated therewith. The device includes a program for calculating elevation based upon the range determined by the laser system, taking into account muzzle velocity and perhaps other factors as well. However, the Groh device does not provide any form of digital electronic display of the target, nor does it provide any means of recording such a display, as provided by the present invention. Moreover, Groh does not provide any means of using his scope and rangefinder with an archery bow, as provided by the present invention.

U.S. Pat. No. 6,397,483 issued on Jun. 4, 2002 to Ronald K. Perkins, titled "Sight Apparatus," describes a bow sight having a digital rangefinder device which communicates with an elevation sight guide having a plurality of LEDs or the like therein. A single one of the LEDs is selectively illuminated by the rangefinder, depending upon the range to the target. However, no digital electronic sight picture is provided by the Perkins device, nor is any means provided for magnifying or recording such a sight picture or using the device with a firearm. The Perkins sight assembly is thus more closely related to the sight apparatus of the '352 U.S. patent to Zykan et al., discussed further above, than it is to the present invention.

U.S. Pat. No. 6,449,419 issued on Sep. 10, 2002 to Richard Brough et al., titled "Optical Viewing System And Clamping Device Therefor," describes a split fiber optic bundle which divides the sight picture from the eyepiece of a firearm scope into two such pictures. One is used by the shooter to view the target, while the other is passed to a camera or the like for recording or transmitting the image. A clamping mechanism for securing the fiber optic cable bundles to the eyepiece of the scope, is also disclosed. No magnification of the image or sight reticles superimposed on the image are disclosed by Brough et al., as these features are incorporated with the scope. Moreover, Brough does not disclose any means of using his invention with an archery bow, as provided by the present invention.

U.S. Pat. No. 6,519,083 issued on Feb. 11, 2003 to James A. Heinrich, titled "Power Focusing Device For A Telescopic Sight," describes an electric motor using a belt to drive the focusing ring of a telescopic sight. The motor may be controlled by a remotely located wireless controller. No digital display, range finding means, or means for incorporating the device with an archery bow are disclosed by Heinrich. The Heinrich device is thus more closely related to the devices of the '875 and '880 U.S. patents respectively to Berry, Jr. et al. and Pitre, than it is to the present invention.

U.S. Pat. No. 6,539,661 issued on Apr. 1, 2003 to Richard W. Hope, titled "Optical Imaging Device For Firearm Scope Attachment," describes a camera or other image recording device which communicates with the eyepiece of a conventional firearm scope to record the image viewed in the scope. No magnification of the image or sight reticles are provided by Hope for his recording device, as these features are incorporated integrally with the scope. The Hope device is more closely related to the devices of the '262 and '419 U.S. patents respectively to Pena and Brough et al., discussed further above, than to the present invention.

U.S. Pat. No. 6,556,245 issued on Apr. 29, 2003 to Larry A. Holmberg, titled "Game Hunting Video Camera," describes a video camera having attachment fittings for attaching to the stabilizer of an archery bow. The Holmberg device is strictly a relatively conventional video recording camera having conventional zoom magnification, and is not aligned with the sight line of the archer when drawing the bow for firing an arrow. Accordingly, Holmberg does not provide any sighting reticles or other alignment means with his camera, as provided by the present bow sight invention. Moreover, Holmberg does not disclose any range finding means with his camera. This must be accomplished by some other apparatus or technique when using the Holmberg camera.

U.S. Pat. No. 6,557,291 issued on May 6, 2003 to Francis B. Hoadley, titled "Sight Apparatus For Guns And Archery Bows," describes a tubular sight apparatus for use with firearms. No magnification or other optical enhancement is disclosed, nor is any means for recording an image or determining the distance to a target. The Hoadley device is strictly an optical alignment device. Moreover, Hoadley does not disclose any means of securing his sight to an archery bow, for use therewith.

U.S. Pat. No. 6,681,512 issued on Jan. 27, 2004 to Dennis J. Sammut, titled "Gunsight And Reticle Therefor," describes a complex optical pattern corresponding to different elevations for different ranges, muzzle velocities, etc. The Sammut reticle is intended for use with a conventional magnifying scope, and thus does not provide any other optics or magnification per se. No range finding means is provided by Sammut; this must be accomplished by other means, with the range then being used by a person using the Sammut reticle to align the reticle with the target as desired. Moreover, no means of recording an image viewed through the scope is disclosed by Sammut.

U.S. Patent Publication No. 2002/122,248 published on Sep. 5, 2002, titled "Power Focusing Device For A Telescopic Sight," is the prior publication of the application from which the '083 U.S. patent to Heinrich, discussed further above, issued. The same points raised in that discussion are seen to apply here as well.

U.S. Patent Publication No. 2003/110,647 published on Jun. 19, 2003, titled "HTM Direct Drive And Positive Positioning Cross Slide And Pin Housing System," describes an essentially conventional bead type sight with mutually orthogonal adjustments for elevation and windage.

The device is not electronic and provides no magnification, no recording of the image viewed through the sight, and no active range finding means. Moreover, the '647 sight is configured only for installation upon an archery bow, with no means for installing upon a firearm being disclosed.

U.S. Patent Publication No. 2004/31,184 published on Feb. 19, 2004, titled "Optical Imaging Device For Firearm Scope Attachment," is a continuation of the application which led to the issued '661 U.S. patent to Hope, discussed further above. The disclosure of the '184 publication is identical to that of the issued '661 U.S. patent, and the same points raised in the discussion of the '661 U.S. patent are seen to apply here as well.

Finally, a web page published on the website maintained at the archeryhistory.com web site on the World Wide Web (www) (undated, but accessed on Mar. 11, 2004) discloses a single illustration of the Leupold Ml Optical Bow sight. The device apparently has a transparent screen up on which the target image appears when the sight is aligned with the target. A fluorescent reticle is superimposed upon the target, when the sight is aligned with the target. However, the device has a Weight of only six ounces and a price of only $39.50, which clearly rule out the incorporation of any electronics other than simple illumination of some sort (and relatively heavy battery power). No adjustment of the reticle relative to the sight picture is disclosed, nor is any means of magnifying or recording the image. Moreover, the means of attaching the device to an archery bow is not disclosed, and there is no suggestion of any adaptation for mounting the Leupold sight on a firearm, as provided by the present camera sight invention.

None of the above inventions and patents, taken either singly or in combination, is seen to describe the instant invention as claimed. Thus a weaponry camera sight solving the aforementioned problems is desired.

SUMMARY OF THE INVENTION

The weaponry camera sight of the present invention provides the benefits of a sight, a magnifying scope, and a range finding device, all in a single device. The sight picture provided by the present sighting apparatus may be electronically recorded using appropriate media, if so desired. The present invention essentially comprises a modification of a digital camera having a display of the picture area for the photographer. The image may be magnified as desired, thereby eliminating the need for a scope when the present invention is used as a weaponry sight. Remote controls for the magnification are provided in order to enable the shooter to adjust the magnification without need to move his or her hand from the weapon. A sighting reticle is provided in the center of the display to allow the shooter to align the weapon with the target. The reticle may be adjusted or modified by the shooter, depending upon the type of weapon with which the present sight is used and other factors.

The present weaponry camera sight is particularly well suited for installation upon an archery bow, with the present disclosure including a multiple component mounting structure for such application. However, the present camera sight may also be installed upon a firearm, if so desired, with a different mounting assembly provided for the attachment of the camera sight to a firearm. The camera sight preferably also includes a range finding apparatus therewith, which is particularly valuable to the archer using the present device with an archery bow.

These and other features of the present invention will be readily apparent upon consideration of the following description and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a camera sight for installation upon a handheld article of weaponry, e.g., a firearm or archery bow. While the present camera sight is particularly well suited for installation upon an archery bow for use as a bow sight, the present disclosure also provides for its installation and use with a firearm, e.g., a rifle.

Figure 1:
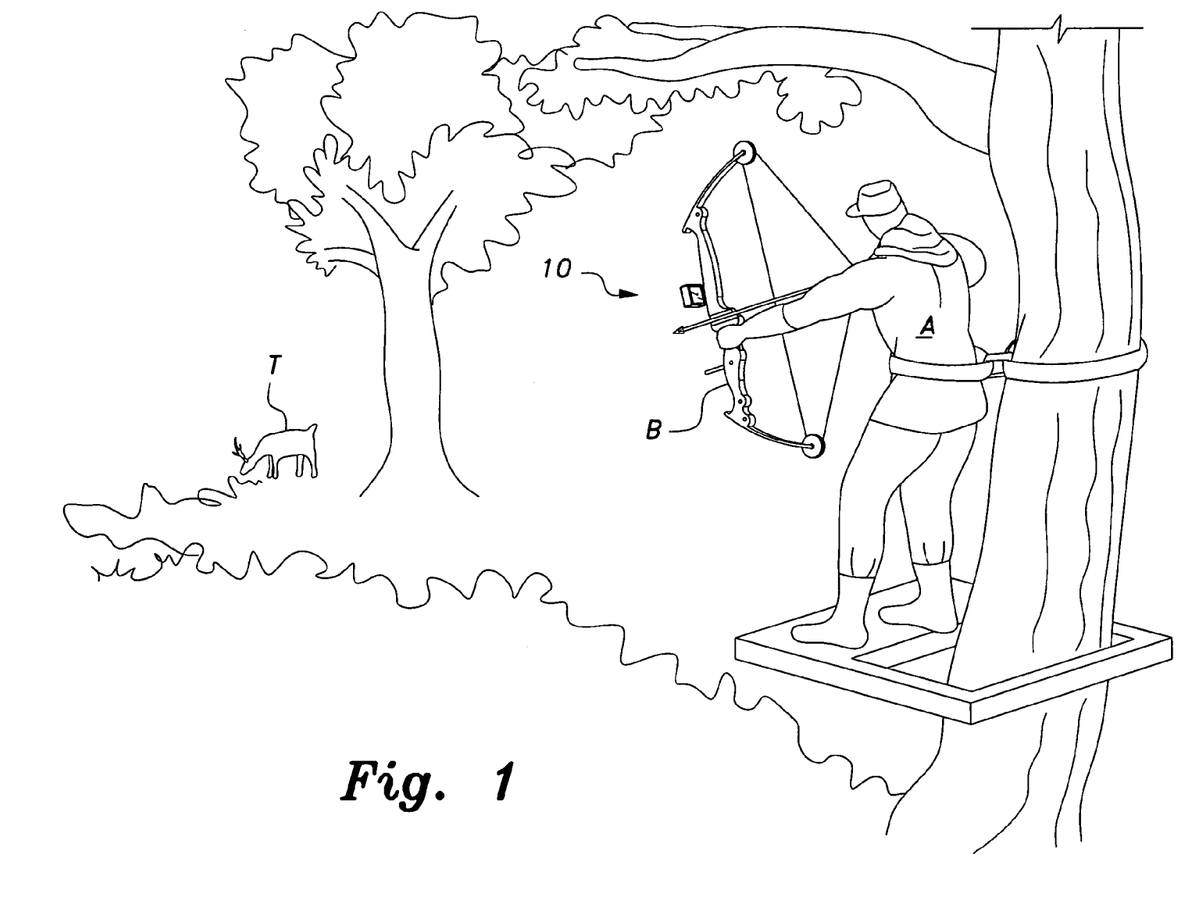
FIG. 1 is an environmental, perspective view of an archer using the weaponry camera sight of the present invention mounted on an archery bow.

FIG. 1 of the drawings provides an environmental perspective view, showing an archer A using a bow B equipped with the present camera sight 10 to aim at a target T, e.g., a game animal. While the bow B depicted is a compound bow, it will be realized that the present camera sight 10 may be installed with other types of bows, e.g., conventional longbows or even crossbows, if so desired, as well as firearms, as exemplified by the installation illustrated in FIG. 5 of the drawings.

Figure 2:
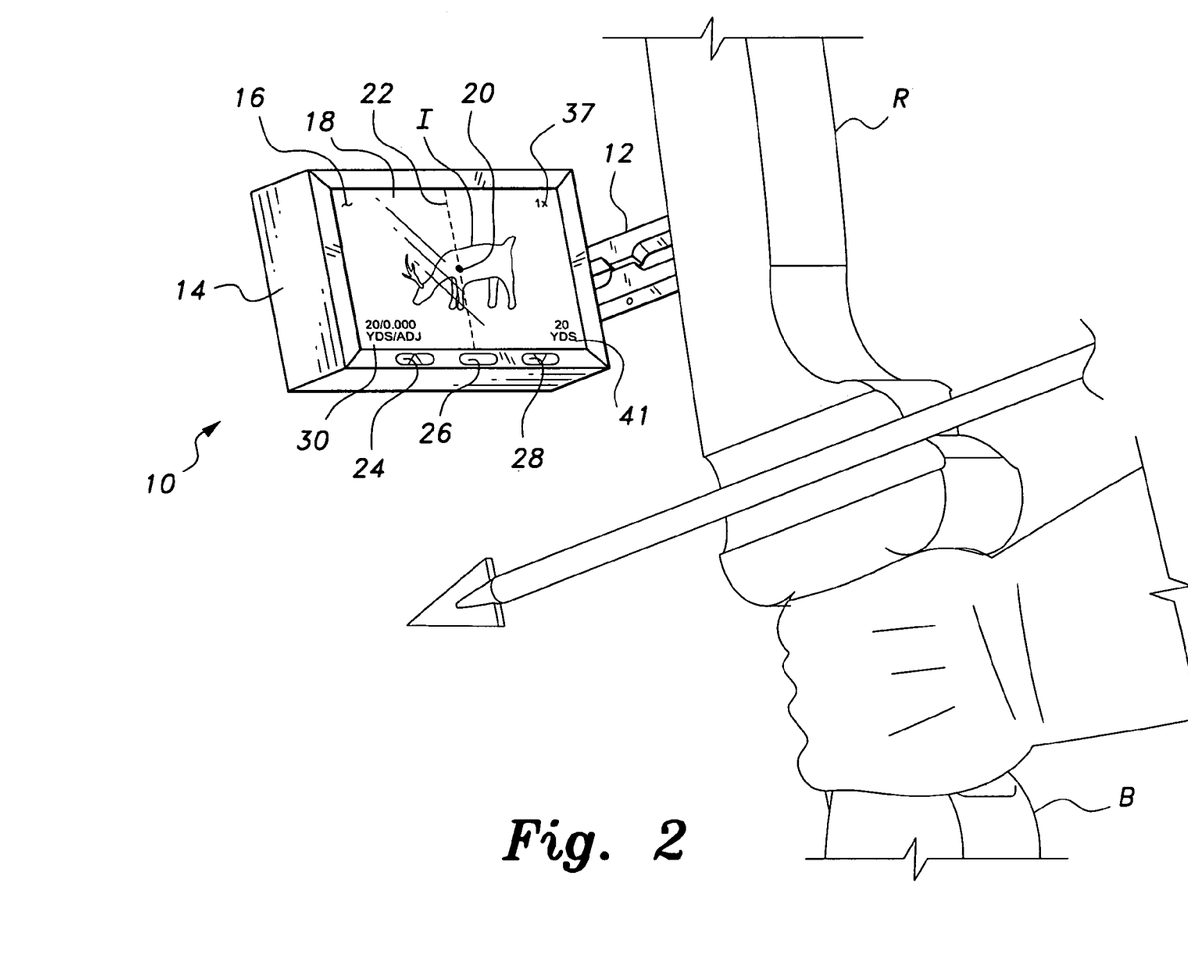
FIG. 2 is a detailed rear perspective view of the archery bow installation of the present weaponry camera sight, showing further details thereof.

FIG. 2 provides a more detailed illustration of the camera sight apparatus 10 and an adjustable mounting bracket or arm 12 extending between the case 14 and the riser R portion of the bow B. The camera sight 10 has a case or housing 14 which contains the various optical and electronic components of the present invention. The rear or display face 16 of the device 10 includes a digital electronic sight picture display screen 18 which displays an image I of the target toward which the sight 10 is aimed. The display screen 18 preferably uses the conventional liquid crystal principle of operation, but other conventional electronic display means may be used as desired. An adjustably positionable sight pin 20 and elevation alignment 22 may also be displayed on the screen 18.

The display face 16 is preferably inset at least slightly from the outer rear edge of the case 14, in order to provide some protection for the screen 18. This also provides an inset border or periphery which may include various controls for the sighting reticle, range information, etc. which may be displayed on screen. This is illustrated generally in FIG. 2, and in more detail in FIG. 4 of the drawings. For example, a series of three buttons, respectively 24, 26, and 28, may be installed along the lower edge of the inset border of the rear of the case 14. The center button 26 may be used to switch or toggle between different features, e.g., sight pin size and elevation on the screen 18.

Figure 4:
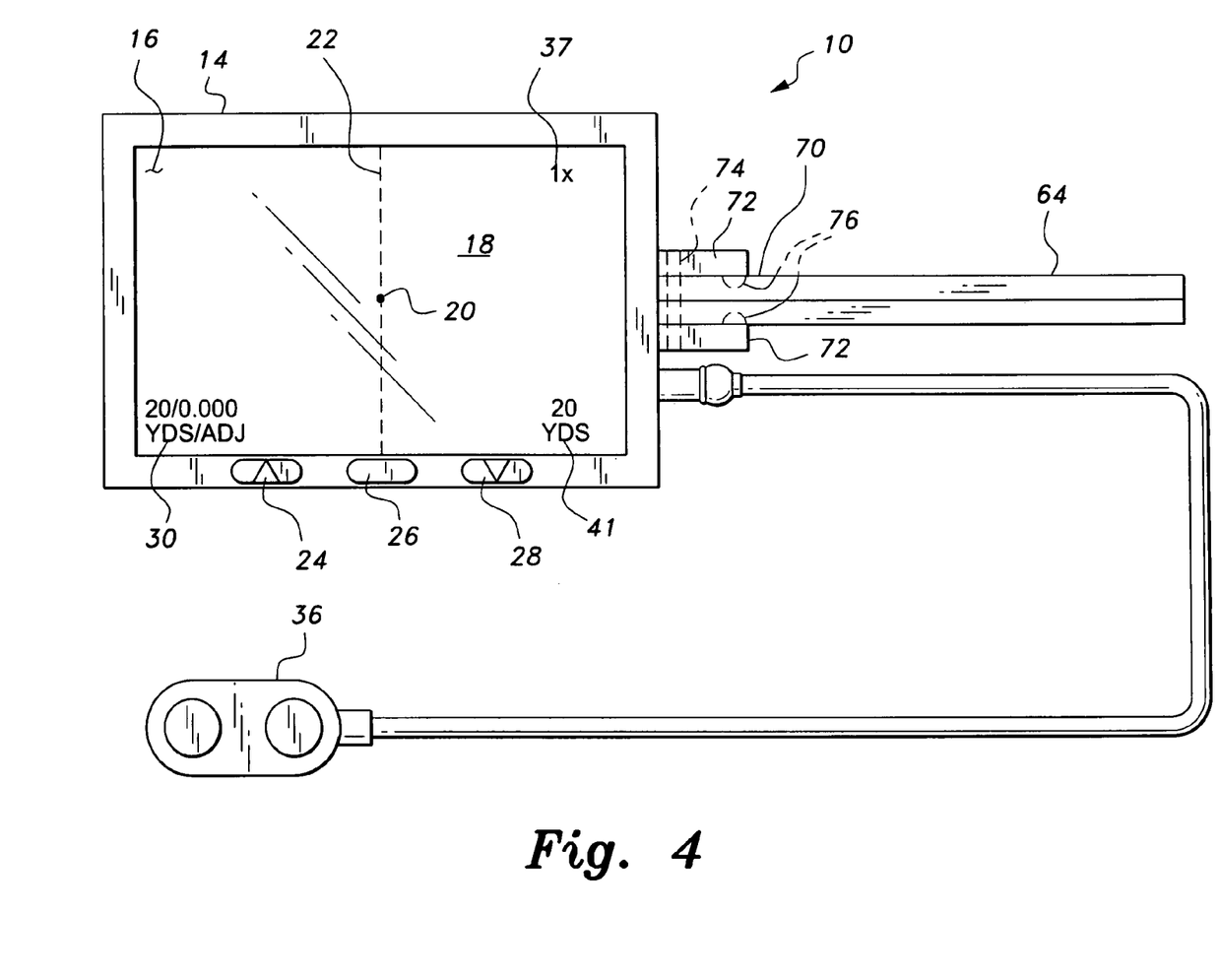
FIG. 4 is a detailed rear elevation view of the camera sight of the present invention, showing the screen picture controls therefor and other features.

The left side button 24 may be used to enlarge the sight pin or reticle 20 as desired, or to adjust the position of the sight pin 20 upwardly along the Y (elevation alignment) axis 22 on the screen 18 as desired to align the reticle or pin 20 with the target, depending upon the feature selected by the center button 26. The opposite right side button 28 may be used to decrease the size of the sight pin 20, or to lower it along the Y axis 22 of the screen 18. The reticle or sight pin distance setting 30 corresponding to the required elevation adjustment for the target range may be displayed in the lower left corner of the display screen 18, or other location as desired. The electronics for operating the sight reticle 20 display are conventional. It will be seen that other controls, e.g., toggle switches for alternative adjustment, etc., may be provided as desired.

Figure 3:
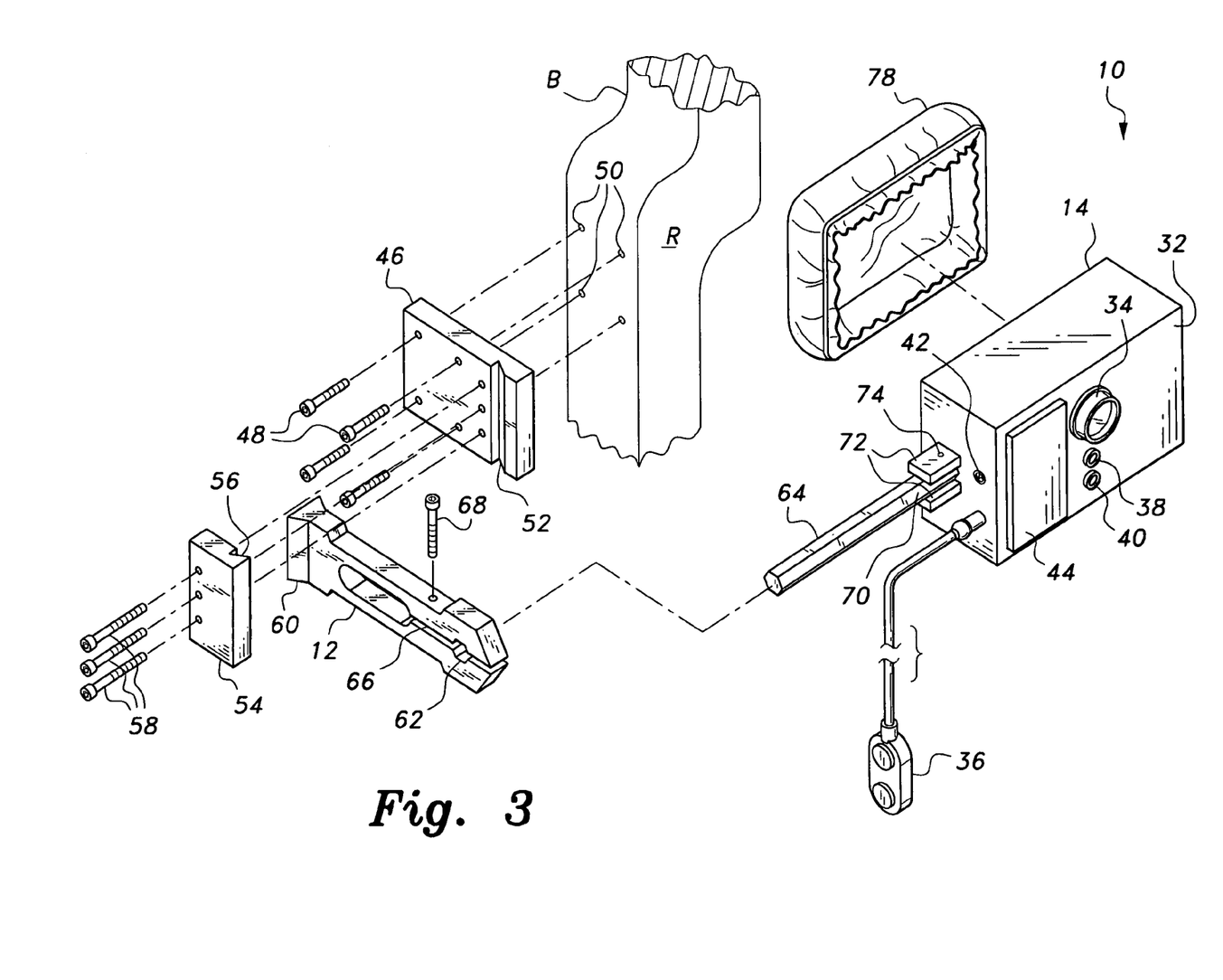
FIG. 3 is an exploded front perspective view of the present weaponry camera sight and the archery bow attachment components therewith, showing their relationships.

The opposite front face 32 of the camera sight 10 is illustrated in FIG. 3 of the drawings, along with details of the mounting bracketry for attaching the sight 10 to an archery bow. An optical zoom magnification lens 34 extends from the front face 32 of the case 10, allowing the shooter to adjust the magnification of the image displayed on the opposite display screen 18 shown in FIGS. 2 and 4. The lens 34 serves to focus an image of the target on light receptors for converting the image to a digital electronic display, as is conventional with digital electronic cameras. The lens 34 preferably includes continuously adjustable magnification, i.e., "zoom" magnification adjustment, in order to provide a larger and more detailed image of a distant target for the shooter, if so desired. The zoom magnification range may be any practicable range as desired, but preferably ranges between one and twelve power. Remotely actuated controls 36 are provided for adjusting the zoom magnification. The controls 36 are located on the bow riser, rifle stock, or other location on the weapon as desired by the shooter to allow the shooter to make adjustments as desired while holding and sighting the weapon. A display 37 of the magnification power may be provided in the upper right portion of the display screen 18.

The front panel 32 of the case or housing 14 also preferably includes a range finding mechanism therein. Various types of active range finding devices may be used, but preferably a laser device is provided, utilizing a light frequency outside of that of the normal visual range. The rangefinder may include a transmission or output lens 38 and a receiving lens 40, with conventional circuitry measuring the time differential between a laser output pulse and the return pulse from the target. The precise aiming point for the laser may be displayed on the display screen 18, so the shooter may determine precisely the object at which the range finder was aimed in order to avoid errors in distance determination to the target. The range determined by the rangefinder may be indicated as a range display 41 in the lower right corner of the display screen 18.

The present camera sight 10 is related to the principle of the conventional digital camera, as has been noted further above. Accordingly, the image displayed upon the display screen 18 may be recorded by suitable means, as desired. The image may be recorded upon an electronic chip, card, disc, etc. contained within the camera sight case 14, or may alternatively be recorded on video tape or by some other means external to the camera sight 10. A receptacle 42 may be provided for the output of data for recording as a pictorial or graphic image, as desired. The various electrical and electronic power needs of the present camera sight 10, i.e., the digital display, zoom lens operation, laser range finding, and video recording and/or output, are met by means of a conventional, rechargeable or disposable electrical storage cell or battery (not shown) disposed in a compartment beneath a battery access panel 44 provided on the case 14.

FIG. 3 also illustrates the details of the weaponry attachment bracketry provided for the present camera sight 10, for adjustably attaching the camera sight 10 to an archery bow B. A mounting plate 46 is secured to the riser R of the bow B in FIG. 3, using conventional Allen head bolts 48 or the like which secure into mating threaded passages 50 conventionally provided in the bow riser R for the attachment of bow sights, stabilizers, and other accessories as desired. The plate 46 includes a generally vertical half dovetail slot 52 formed along the forward portion thereof, with an opposed clamp component 54 having a mirror image half dovetail slot 56 attaching to the plate 46 by means of a series of Allen bolts 58 or the like. The plate 46 and clamp 54 adjustably capture the dovetail end 60 of the mounting bracket or arm 12 therebetween, to allow the bracket arm 12 and its attached camera sight 10 to be adjusted vertically within the dovetail slot defined by the mount 46 and clamp 54.

The bracket arm 12 includes a lateral camera sight arm attachment passage 62 therethrough, into which a camera sight attachment arm 64 inserts. The passage 62 and arm 64 may have mating polygonal cross sections, or at least non-circular sections, in order to preclude rotation of the arm 64 within the passage 62. The bracket 12 includes a longitudinal split 66 therein, with a pinch bolt 68 securing the two sides together to clamp them about the arm 64 as desired. Lateral adjustment of the position of the camera sight 10 is accomplished independently of the vertical adjustment by means of the dovetail components, by loosening the pinch bolt 68 and sliding the lateral arm 64 within the passage 62 of the mounting bracket arm 12 as desired.

The camera sight case 14 is preferably pivotally attached to the proximal end 70 of the camera sight attachment arm 64 to allow the camera sight 10 to fold closer to the bow B (or firearm, if used therewith) for more compact storage and to reduce the likelihood of the sight 10 catching upon some other object. A pair of cheek plates 72 extend from the side of the camera sight case 14, with the proximal end 70 of the camera sight attachment arm 64 being secured therebetween by a hinge or pivot pin 74 (shown in broken lines in FIG. 4). At least one, or an opposing pair of, spring-biased detent ball(s) 76 extend from the facing side(s) of at least one of the cheek plates 72, and engage at least one corresponding detent(s) in the side(s) of the camera sight attachment arm 64. When the arm 64 is fully extended, the detent ball(s) 76 is/are fully seated within the corresponding detent(s), thereby holding the arm 64 in its extended position, accurately aligned to hold the camera sight 10 in position precisely as desired. A master on/off switch (not shown) may be incorporated with the hinge and detent mechanism, to provide power to the various electronic functions of the camera sight 10 when the device 10 is fully extended or deployed, and to automatically disconnect power when the camera sight 10 is folded. Additional alignment means, e.g. laser sight alignment, may be provided if so desired.

Preferably, the camera sight case 14 is a well sealed unit to preclude the entrance of moisture, dust, etc. therein. The various keys or buttons 24 through 28 may comprise membrane type controls, to preclude the entrance of foreign matter between the edge of the keys or buttons and the case 14. Additional protection may be provided for the device 10 when it is not in use, by means of a simple cover or cap 78 which may be elastically secured over the display screen 18, if so desired. The cap or cover 78 is essentially a thin, flexible, moistureproof sheet of material having an elastic periphery slightly smaller than the periphery of the case 14, with the elastic periphery of the cover 78 holding it in place elastically about the periphery of the case 14. An additional such cover or cap (not shown) may be provided to cover the front of the device 10, with its optical lens 34 and rangefinder elements 38 and 40, if so desired.

Figure 5:
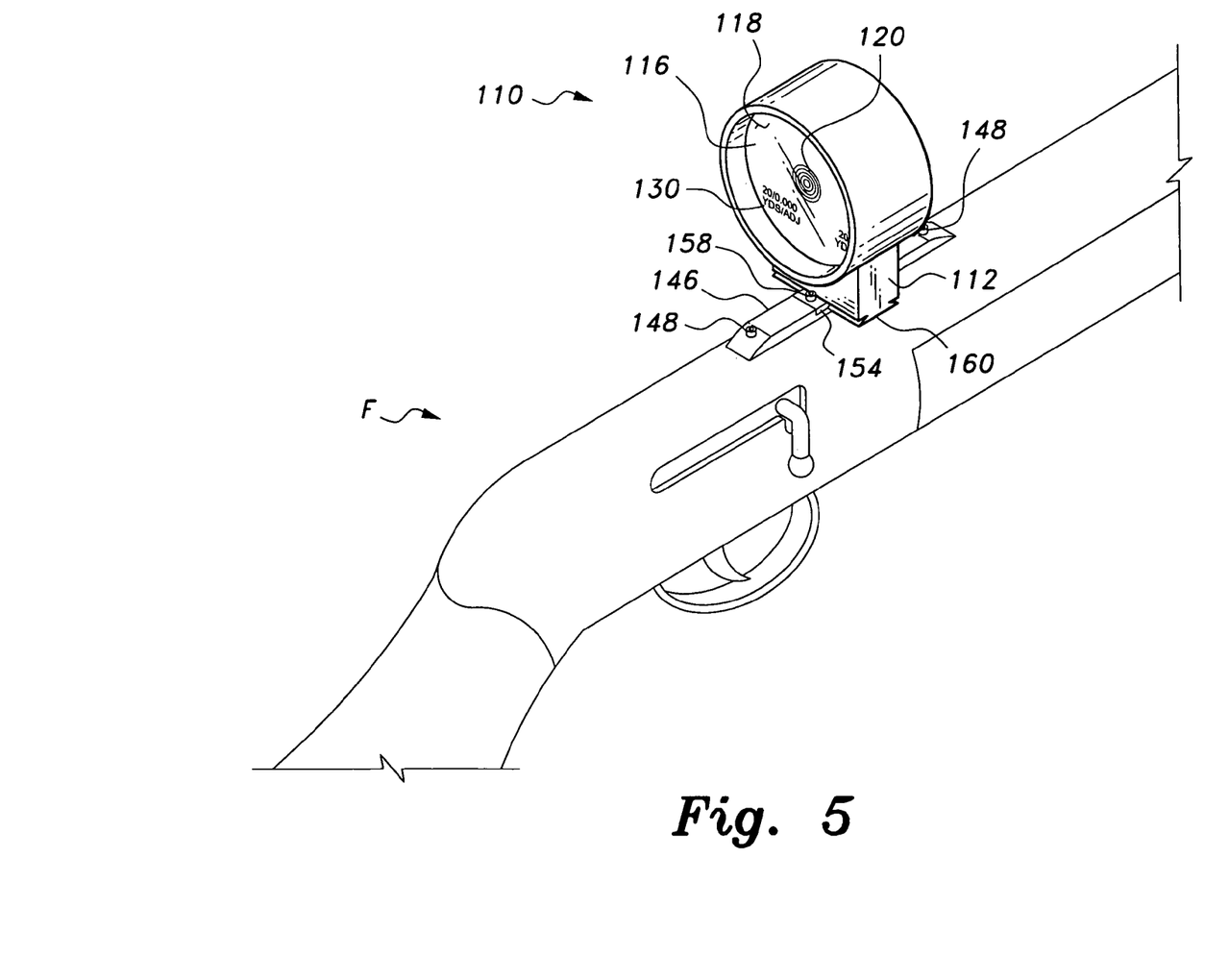
FIG. 5 is a detailed rear perspective view of an alternative embodiment of the present weaponry camera sight, showing its installation upon a firearm.

FIG. 5 provides an illustration of an alternate embodiment of the present invention, wherein a variation of the present invention is secured to a firearm F for use as a camera sight. The camera sight 110 of FIG. 5 may have a circular, or at least non-rectangular, cross-sectional shape, if so desired, or may be identical to the camera sight 10 of FIGS. 1 through 4. Generally speaking, firearms are used to reach targets at somewhat greater ranges than archery bows, and as such the sight picture provided need not be so large as that provided with an archery bow sight. As the present camera sight 10 or 110 is capable of magnifying the sight picture, the sight 10 or 110 used with a firearm F may function in much the same manner as a conventional firearm scope, for the purposes of sighting the target. The optical zoom lens and laser output and input elements are hidden in the single rear perspective view provided for the camera sight 110 of FIG. 5, but will be understood to have physically analogous locations and functions to those components 34, 38, and 40 illustrated in FIG. 3 for the camera sight 10 embodiment.

The rearward face 116 of the camera sight 110 includes a display screen 118, which presents essentially the same information provided by the display screen 18 of the camera sight 10 illustrated in FIGS. 1 through 4 and described further above. The target reticle 120 may be formed as a series of concentric circles in the form of a "bull's eye," as shown, or other reticle forms may be used as desired. The electronics of the present camera sight allow the configuration of the reticle to be revised or adjusted by the shooter or user of the device, as desired. The screen 118 preferably provides essentially the same information as provided on the screen 18 of the embodiment 10 of FIGS. 1 through 4, i.e. an elevation setting 130 in the lower left portion of the screen 118 to compensate for drop over a distance, a range display 141 in the lower right portion of the screen 118, and a display of the magnification setting in the upper right portion of the screen (not shown in FIG. 5, due to the shrouded edge of the screen 118). The zoom magnification controls are concealed in FIG. 5, as they extend along the left side of the fore stock of the firearm F in FIG. 5, where they may be easily manipulated by the left hand of a right handed shooter. The zoom magnification and other controls for the camera sight 110 of FIG. 5 will be understood to be essentially the same as those illustrated for the camera sight 10 of FIGS. 1 through 4.

The camera sight 110 of FIG. 5 may be secured to the firearm F by means of the conventional scope mounting points normally provided on rifles and some other firearms. A longitudinally disposed base plate 146 is secured to the top of the firearm F by a pair of Allen head bolts 148 or the like. The base plate 146 includes a half dovetail slot (not shown, but equivalent to the half dovetail slot 52 of the mounting plate 46 shown in FIG. 3), which engages one side of a dovetail fitting 160 on the base of the camera sight mounting bracket 112. A removable clamp component 154 is secured atop the mounting plate 146 by another Allen bolt 158, with the configuration of the clamp 154 in concert with the opposite jaw of the mounting plate 146 serving to grip the dovetail base 160 of the camera sight mounting bracket 112 securely therebetween. This configuration will be seen to be equivalent to the mating dovetail components 46, 54, and 60 of the mounting assembly shown in FIG. 3 for the camera sight 10. Lateral adjustment of the camera sight 110 relative to the underlying mounting plate 146 is easily accomplished by loosening the clamp bolt 158 and sliding the camera sight 110 on its mounting bracket 112 laterally to the position desired, then tightening the clamp bolt 158.

In conclusion, the present camera sight embodiments provide numerous benefits over earlier sights of the related art. The zoom magnification provided by the present sights enables the shooter to have a relatively wide field of view in order to relate the target to its surroundings through the sight, then to zoom in on the target to form a precise aiming point. The electronic display enables the shooter to aim and shoot in relatively low lighting conditions, with the sighting reticle being visible at all times. The precise distance measurement provided by the active measurement means of the present camera sight, assure that shots will not miss high or low due to miscalculation of distance and drop allowance for the arrow or round. With the development of digital camera technology, the present invention costs little more than a conventional firearm scope, and is competitive in cost with some relatively complex archery sights. Yet, the present camera sight provides many more features, and will be greatly appreciated by archers and firearm shooters alike.

It is to be understood that the present invention is not limited to the embodiments described above, but encompasses any and all embodiments within the scope of the following claims.

I claim:

1. A weaponry camera sight for aiming at a target, comprising:
   a camera sight case, having:
      a front face;
      an optical zoom magnification lens assembly disposed within said front face;
      a rear face opposite said front face;
      a digital electronic sight picture display screen disposed upon said rear face;
      an adjustably positionable sighting reticle disposed upon said display screen, optically alignable with the target;
      a plurality of sighting reticle adjustment controls disposed upon said rear face of said case adjacent said display screen; and
   an adjustably positionable weaponry mounting bracket extending from said case.

2. The weaponry camera sight according to claim 1, further including a data receptacle for recording an image viewed through the lens assembly.

3. The weaponry camera sight according to claim 1, further including remote controls for adjusting said optical zoom magnification lens assembly.

4. The weaponry camera sight according to claim 1, further including a laser rangefinder disposed within said case, and selectively projecting a range finding beam aligned toward the target.

5. The weaponry camera sight according to claim 1, further including mutually independent horizontal and vertical positional adjustment on said weaponry mounting bracket.

6. The weaponry camera sight according to claim 1, wherein said display screen comprises a liquid crystal display.

7. The weaponry camera sight according to claim 1, further including a cover removably installed over said display screen.

8. A weaponry camera sight for aiming at a target, comprising:
- a camera sight case, including:
  - a front face;
  - an optical zoom magnification lens assembly disposed within said front face;
  - a rear face opposite said front face;
  - a digital electronic sight picture display screen disposed upon said rear face;
  - a data receptacle for recording an image viewed through said lens assembly;
  - a laser rangefinder disposed within said case, and selectively projecting a range finding beam aligned toward the target;
- an adjustably positionable weaponry mounting bracket extending from said case;
- an adjustably positionable sighting reticle disposed upon said display screen, optically alignable with the target; and
- a plurality of sighting reticle adjustment controls disposed upon said rear face of said case adjacent said display screen.

9. The weaponry camera sight according to claim 8, further including remote controls for adjusting said optical zoom magnification lens assembly.

10. The weaponry camera sight according to claim 8, further including mutually independent horizontal and vertical positional adjustment on said weaponry mounting bracket.

11. The weaponry camera sight according to claim 8, wherein said display screen comprises a liquid crystal display.

12. The weaponry camera sight according to claim 8, further including a cover removably installed over said display screen.

13. A weaponry camera sight for aiming at a target, comprising:
- a camera sight case, including:
  - a front face;
  - an optical zoom magnification lens assembly disposed within said front face;
  - remote controls for adjusting said optical zoom magnification lens assembly;
  - a rear face opposite said front face;
  - a digital electronic sight picture display screen disposed upon said rear face;
  - a laser rangefinder disposed within said case, selectively projecting a range finding beam aligned toward the target;
- an adjustably positionable weaponry mounting bracket extending from said case;
- an adjustably positionable sighting reticle disposed upon said display screen, optically alignable with the target; and
- a plurality of sighting reticle adjustment controls disposed upon said rear face of said case adjacent said display screen.

14. The weaponry camera sight according to claim 13, further including a data receptacle for recording an image viewed through said lens assembly.

15. The weaponry camera sight according to claim 13, further including mutually independent horizontal and vertical positional adjustments disposed on said weaponry mounting bracket.

16. The weaponry camera sight according to claim 13, wherein:
- said display screen comprises a liquid crystal display; and
- said display screen further includes a cover removably installed thereover.

* * * * *